United States Patent
Lee et al.

(10) Patent No.: US 11,291,000 B2
(45) Date of Patent: Mar. 29, 2022

(54) COVERAGE FOR TIME DIVISION DUPLEX SYSTEMS

(71) Applicant: INTERDIGITAL PATENT HOLDINGS, INC., Wilmington, DE (US)

(72) Inventors: Moon-il Lee, Melville, NY (US); Pouriya Sadeghi, San Diego, CA (US); Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/813,283

(22) Filed: Mar. 9, 2020

(65) Prior Publication Data

US 2020/0214005 A1    Jul. 2, 2020

Related U.S. Application Data

(63) Continuation of application No. 15/504,172, filed as application No. PCT/US2015/044916 on Aug. 12, 2015, now Pat. No. 10,588,125.

(Continued)

(51) Int. Cl.
*H04W 72/04* (2009.01)
*H04L 1/18* (2006.01)
(Continued)

(52) U.S. Cl.
CPC ......... *H04W 72/0446* (2013.01); *H04L 1/189* (2013.01); *H04L 1/1822* (2013.01);
(Continued)

(58) Field of Classification Search
CPC ....... H04L 5/14; H04L 5/0053; H04L 5/0073; H04L 1/08; H04L 1/1822; H04L 1/189;
(Continued)

(56) References Cited

U.S. PATENT DOCUMENTS 9,125,188 B2   9/2015 Tamaki et al.
9,185,620 B2   11/2015 Khoryaev et al.
(Continued)

FOREIGN PATENT DOCUMENTS

EP    2 919 402      9/2015
WO    2013/111607   8/2013

OTHER PUBLICATIONS

Catt, "UCI transmission for Rel-13 low complexity UEs," 3GPP TSG RAN WG1 Meeting #80bis, R1-151341, Belgrade, Serbia (Apr. 20-24, 2015).

(Continued)

*Primary Examiner* — Hoang-Chuong Q Vu
(74) *Attorney, Agent, or Firm* — Volpe Koenig

(57) ABSTRACT

A wireless transmit/receive unit (WTRU) may receive a first physical downlink shared channel (PDSCH) signal including a system information block (SIB) with a first time division duplex (TDD) uplink (UL)/downlink (DL) configuration. Also, the WTRU may receive a second PDSCH signal including dedicated radio resource control (RRC) signaling with a second TDD UL/DL configuration; and may receive a physical downlink control channel (PDCCH) signal including an uplink grant indicating at least one repetition transmission on a physical uplink shared channel (PUSCH). Further the WTRU may determine at least one time interval of the at least one repetition transmission would overlap with a downlink time interval indicated by the first TDD UL/DL configuration, the second TDD UL/DL configuration, or both. Also, the WTRU may transmit at least one repetition transmission on the PUSCH in at least one time interval that is non-overlapping with the indicated downlink time interval.

20 Claims, 6 Drawing Sheets

Related U.S. Application Data

(60) Provisional application No. 62/038,007, filed on Aug. 15, 2014.

(51) Int. Cl.
  *H04L 5/14* (2006.01)
  *H04W 4/70* (2018.01)
  *H04B 7/26* (2006.01)

(52) U.S. Cl.
  CPC .............. *H04L 5/14* (2013.01); *H04B 7/2656* (2013.01); *H04L 5/1469* (2013.01); *H04W 4/70* (2018.02)

(58) Field of Classification Search
  CPC ........................... H04L 5/1469; H04W 48/12; H04W 72/0446; H04W 74/006; H04W 72/04; H04W 4/70; H04W 72/0406; H04B 7/2656
  See application file for complete search history.

(56) References Cited

U.S. PATENT DOCUMENTS

| | | | |
|---|---|---|---|
| 9,219,595 B2* | 12/2015 | Yin | ......................... H04L 5/001 |
| 9,485,763 B2 | 11/2016 | You et al. | |
| 9,692,582 B2* | 6/2017 | Yin | ........................ H04L 5/0091 |
| 9,860,826 B2 | 1/2018 | Webb et al. | |
| 9,974,057 B2 | 5/2018 | Hwang et al. | |
| 10,064,169 B2 | 8/2018 | Bai et al. | |
| 2013/0155915 A1 | 6/2013 | Park et al. | |
| 2013/0163537 A1 | 6/2013 | Anderson et al. | |
| 2014/0086112 A1 | 3/2014 | Stern-Berkowitz et al. | |
| 2014/0204807 A1 | 7/2014 | Li et al. | |
| 2015/0016312 A1 | 1/2015 | Li et al. | |
| 2015/0055519 A1* | 2/2015 | Lin | ........................ H04L 1/1607 370/280 |
| 2015/0078349 A1* | 3/2015 | He | ........................ H04W 4/70 370/336 |
| 2015/0085717 A1 | 3/2015 | Papasakellariou et al. | |
| 2015/0092566 A1 | 4/2015 | Balachandran et al. | |
| 2015/0092629 A1* | 4/2015 | Seo | ........................ H04L 5/14 370/280 |
| 2015/0117272 A1* | 4/2015 | Gao | ....................... H04L 1/1861 370/280 |
| 2015/0131579 A1 | 5/2015 | Li et al. | |
| 2015/0173065 A1* | 6/2015 | Fu | ........................ H04L 1/1896 370/280 |
| 2015/0358133 A1 | 12/2015 | Kusashima et al. | |
| 2016/0262182 A1* | 9/2016 | Yang | ..................... H04W 72/04 |
| 2016/0353420 A1 | 12/2016 | You et al. | |
| 2016/0353440 A1 | 12/2016 | Lee et al. | |
| 2017/0273027 A1 | 9/2017 | Kim et al. | |
| 2018/0014278 A1 | 1/2018 | Papasakellariou et al. | |
| 2018/0139743 A1 | 5/2018 | Yang et al. | |

OTHER PUBLICATIONS

Dahlman et al., "4G: LTE/LTE-Advanced for Mobile Broadband," Second Edition, pp. 491-492 (2014).
Editor (Motorola Mobility), "Introduction of Rel-12 LTE-Advanced features in 36.213," 3GPP TSG-RAN WG1 Meeting #77, R1-142501, Seoul, Korea, (May 19-23, 2014).
Intel Corporation, "Discussion on SPS configuration for TDD eIMTA," 3GPP TSG RAN WG2 Meeting #85bis, R2-141229, Valencia, Spain (Mar. 31-Apr. 4, 2014).
Interdigital, "On signaling and fallback operation for TDD UL-DL reconfiguration," 3GPP TSG-RAN WG1 Meeting #74, R1-133175, Barcelona, Spain (Aug. 19-23, 2013).
Interdigital, "Physical Channels for Unicast Traffic in Rel-13 LC-MTC ," 3GPP TSG RAN WG1 Meeting #78bis, R1-144205, Ljubljana, Slovenia (Oct. 6-10, 2014).
Interdigital, "Physical channels for unicast traffic in Rel-13 MTC," 3GPP TSG RAN WG1 Meeting #79, R1-145049, San Francisco, USA (Nov. 17-21, 2014).
Sharp, "Fallback operation and reliability improvement of explicit L1 signalling for DL-UL reconfiguration," 3GPP TSG RAN WG1 Meeting #74, R1-133228, Barcelona, Spain (Aug. 19-23, 2013).
Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).
Third Generation Partnership Project, "Technical Specification Group Radio Access Network; Evolved Universal Terrestrial Radio Access (E-UTRA); Physical layer procedures (Release 12)," 3GPP TS 36.213 V12.2.0 (Jun. 2014).
Third Generation Partnership Project, "Technical Specification Group Radio Access Network; Evolved Universal Terrestrial Radio Access (E-UTRA); Physical layer procedures (Release 12)," 3GPP TS 36.213 V12.6.0 (Jun. 2015).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.5.0 (Jun. 2012).
Third Generation Partnership Project, "Technical Specification Group Radio Access Network; Evolved Universal Terrestrial Radio Access (E-UTRA); Physical channels and modulation (Release 12)," 3GPP TS 36.211 V12.2.0 (Jun. 2014).
Third Generation Partnership Project, "Technical Specification Group Radio Access Network; Evolved Universal Terrestrial Radio Access (E-UTRA); Physical channels and modulation (Release 12)," 3GPP TS 36.211 V12.6.0 (Jun. 2015).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.5.0 (Mar. 2012).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.1.0 (Jun. 2014).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.5.0 (Jun. 2015).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.2.0 (Jun. 2014).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.6.0 (Jun. 2015).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2012).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.2.1 (Jun. 2014).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.6.0 (Jun. 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.5.0 (Sep. 2011).
Third Generation Partnership Project, "Technical Specification Group Radio Access Network; Evolved Universal Terrestrial Radio Access

(56) References Cited

OTHER PUBLICATIONS (E-UTRA) and Evolved Universal Terrestrial Radio Access Network (E-UTRAN);Overall description; Stage 2 (Release 12)," 3GPP TS 36.300 V12.2.0 (Jun. 2014).
Third Generation Partnership Project, "Technical Specification Group Radio Access Network; Evolved Universal Terrestrial Radio Access (E-UTRA) and Evolved Universal Terrestrial Radio Access Network (E-UTRAN);Overall description; Stage 2 (Release 12)," 3GPP TS 36.300 V12.5.0 (Mar. 2015).
ZTE, "HARQ timing in TDD-eIMTA," 3GPP TSG RAN WG1 Meeting #72, R1-130130, St Julian's, Malta (Jan. 28-Feb. 1, 2013).
Third Generation Partnership Project, "Technical Specification Group Radio Access Network; Evolved Universal Terrestrial Radio Access (E-UTRA); Services provided by the physical layer (Release 13)," 3GPP TS 36.302 V12.0.0 (Jun. 2014).
Third Generation Partnership Project, "Technical Specification Group Radio Access Network; Evolved Universal Terrestrial Radio Access (E-UTRA); Services provided by the physical layer (Release 13)," 3GPP TS 36.302 V12.4.0 (Jun. 2015).
Alcatel-Lucent Shanghai Bell et al., "On the study item conclusions for LTE TDD for UL-DL IMTA," 3GPP TSG RAN WG1 Meeting #69, R1-122509, Prague, Czech Republic (May 21-25, 2012).
HTC, "Discussion on coverage enhancement in TDD eIMTA systems," 3GPP TSG RAN WG1 Meeting #74bis, R1-134636, Guangzhou, China (Oct. 7-11, 2013).
Nsn et al., "Coverage enhancements analysis for low cost MTC UEs," 3GPP TSG-RAN WG2 Meeting #85, R2-140063, Prague, Czech Republic (Feb. 10-14, 2014).
Vodafone, "Summary of LC_MTC_LTE agreements after RAN1#77," 3GPP TSG RAN WG1 #77, R1-142760, Seoul, Korea (May 19-23, 2014).

* cited by examiner

COVERAGE FOR TIME DIVISION DUPLEX SYSTEMS

CROSS REFERENCE TO RELATED APPLICATION

This application is a continuation of U.S. patent application Ser. No. 15/504,172 filed Feb. 15, 2017, which is the U.S. National Stage, under 35 U.S.C. § 371, of International Application No. PCT/US2015/044916 filed Aug. 12, 2015, which claims the benefit of U.S. Provisional Application No. 62/038,007 filed Aug. 15, 2014, the contents of which are hereby incorporated by reference herein.

BACKGROUND

In a wireless system, a wireless transmit/receive unit (WTRU) may acquire cell and network related system information which it may use for cell selection, access, and/or connection establishment. The system information may be broadcast by the cell in blocks. The information blocks may include a Master Information Block (MIB), a System Information Block (SIB) or multiple SIBs.

SIB information may be related to cell access, cell reselection information, Multimedia Broadcast/Multicast Service (MBMS), and emergency and warning system related information that the WTRU may need. Some of the SIBs may be optional based on the configuration of the cell and network, and may not be transmitted by the cell.

SUMMARY

Methods and systems are disclosed regarding repeating a transmission of subframes and channels, and reception of subframes and channels. Methods and systems are disclosed for use by a wireless transmit/receive unit (WTRU) operating in a coverage enhanced (CE) or coverage enhancement mode. The WTRU may receive a first Time Division Duplex (TDD) uplink (UL)/downlink (DL) subframe configuration and may receive a second TDD UL/DL subframe configuration. The WTRU may determine one or more subframes to use for receiving DL repetitions based on the first TDD UL/DL subframe configuration, and one or more subframes to use for transmitting UL repetitions based on the second TDD UL/DL subframe configuration. The WTRU may receive DL repetitions of a DL signal only in the determined one or more subframes for receiving DL repetitions. The WTRU may also transmit UL repetitions of a UL signal only in the determined one or more subframes for transmitting UL repetitions. The WTRU may receive a TDD transmission using enhanced Interference Mitigation and Traffic Adaptation (eIMTA) capability.

In addition, methods and systems are disclosed for use by a WTRU operating in a CE or coverage enhancement mode. The WTRU may receive a first TDD UL/DL subframe configuration to identify eIMTA-Physical Downlink Control Channel (PDCCH) repetitions. The WTRU may combine the eIMTA-PDCCH repetitions to determine a second TDD UL/DL subframe configuration. The WTRU may transmit repetitions of a Physical Downlink Shared Channel (PDSCH) using the second TDD UL/DL subframe configuration and may receive repetitions of a Physical Uplink Shared Channel (PUSCH) using the second TDD UL/DL subframe configuration.

Further, methods and systems are disclosed regarding repeating transmissions containing information blocks and used by a WTRU operating in a CE or coverage enhancement mode. A Physical Broadcast Channel (PBCH) may contain a Master Information Block (MIB) and PDSCH may contain a System Information Block (SIB). Either or both of the PBCH and PDSCH may be transmitted repetitively and in predefined locations. The PBCH may be repeatedly transmitted in the Downlink Pilot Time Slot (DwPTS) region with a predefined special subframe configuration. A first set of orthogonal frequency-division multiplexing (OFDM) symbols may be predefined for a PDCCH and a second set may be used for PBCH repetitions. The WTRU may perform blind detection of the special subframe configuration and integrate the repeated PBCH in the special subframe in the DwPTS region. Further, the WTRU may perform multiple decoding attempts with different PBCH repetition candidates in parallel.

The repeated SIB may be located in a defined repetition window. The repetition window may be defined by multiples of a predefined modification period or a System Frame Number (SFN) cycle. SIB repetitions may be received in even-numbered radio frames. Repetitions may be sent using TDD transmissions with Hybrid Automatic Repeat Request (HARQ) protocol processes. A repetition window may be defined in a TDD transmission. UL and DL resources for transmission repetition may be allocated using a default TDD configuration. Further, DL resources may be allocated based on a TDD subframe configuration signaled in SIB-1. Also, UL resources may be allocated based on a TDD subframe configuration signaled in higher layer Radio Resource Control (RRC) signaling.

The WTRU may receive the eIMTA-PDCCH with repetitions. The DL subframes and special subframes indicated in a TDD subframe configuration signaled in an eIMTA-PDCCH may be the DL resource for repetitions. Also, the UL subframes in the TDD subframe configuration signaled in an eIMTA-PDCCH may be the UL resource for repetitions. The WTRU may fallback to operating in a default TDD mode of operation.

In another example, a WTRU may receive a PDSCH signal including a SIB. The SIB may include a first TDD UL/DL configuration. Also, the WTRU may receive a second PDSCH signal including dedicated RRC signaling, where the dedicated RRC signaling includes a second TDD UL/DL configuration. Further, the WTRU may receive a PDCCH signal including an uplink grant, where the uplink grant indicates at least one repetition transmission on a PUSCH. Further the WTRU may determine at least one time interval of the at least one repetition transmission would overlap with a downlink time interval indicated by the first TDD UL/DL configuration, a downlink time interval indicated by the second TDD UL/DL configuration, or both. Also, the WTRU may transmit at least one repetition transmission on the PUSCH in at least one time interval that is non-overlapping with the downlink time interval indicated by the first TDD UL/DL configuration, the downlink time interval indicated by the second TDD UL/DL configuration, or both.

In another example, the first TDD UL/DL configuration may be indicated in a bit map. Also, the second TDD UL/DL configuration may be indicated in a bit map. In a further example, the first TDD UL/DL configuration may be indicated in a first parameter and the second TDD UL/DL configuration may be indicated in a second parameter. In an additional example, the SIB may be a SIB Type 1 (SIB-1). Further, the SIB may be a SIB Type 2 (SIB-2).

BRIEF DESCRIPTION OF THE DRAWINGS

A more detailed understanding may be had from the following description, given by way of example in conjunction with the accompanying drawings wherein.

DETAILED DESCRIPTION

Figure 1A:
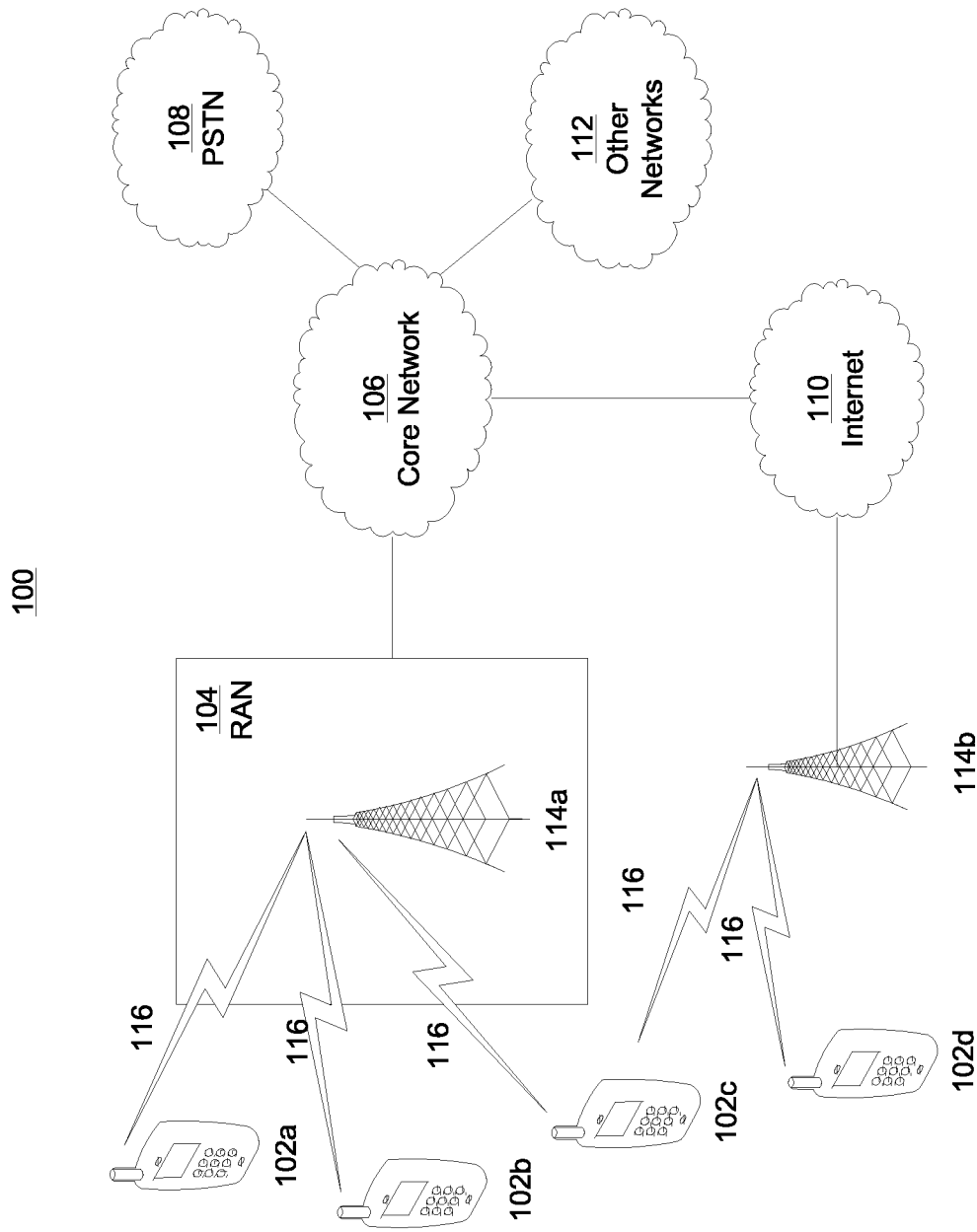
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
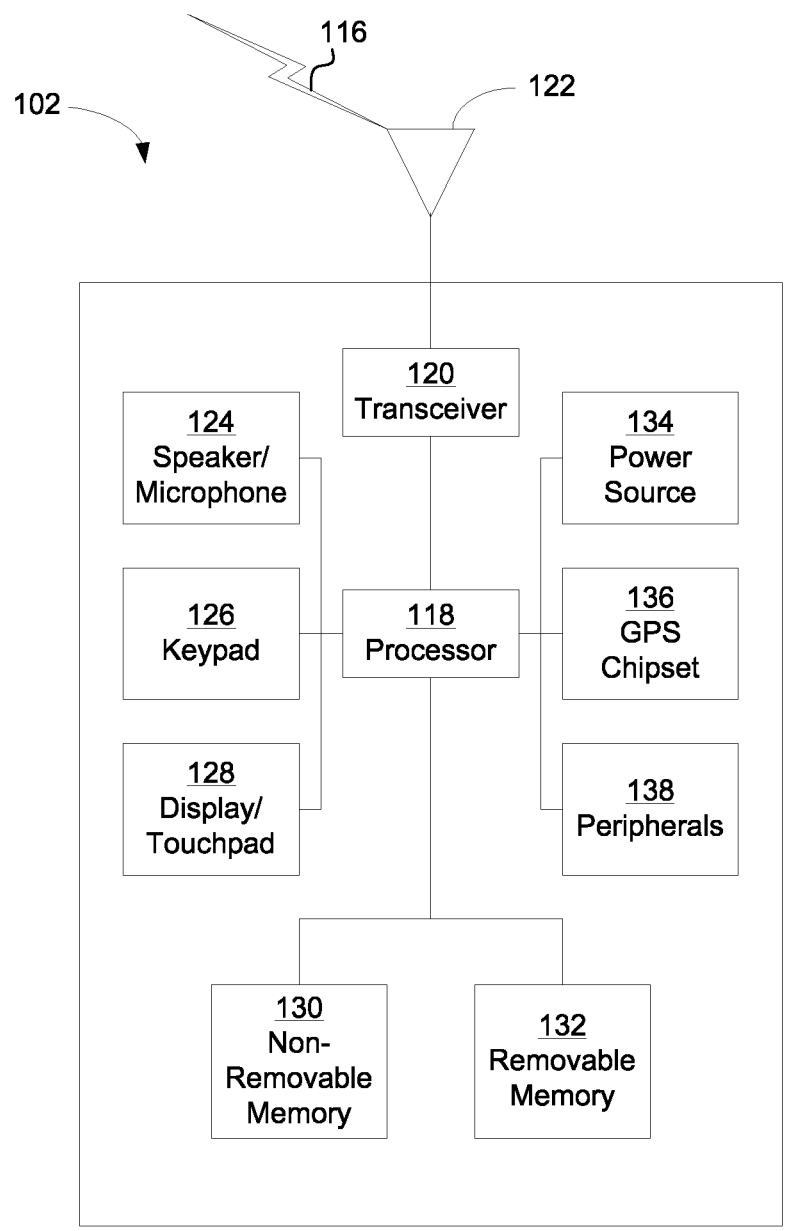
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
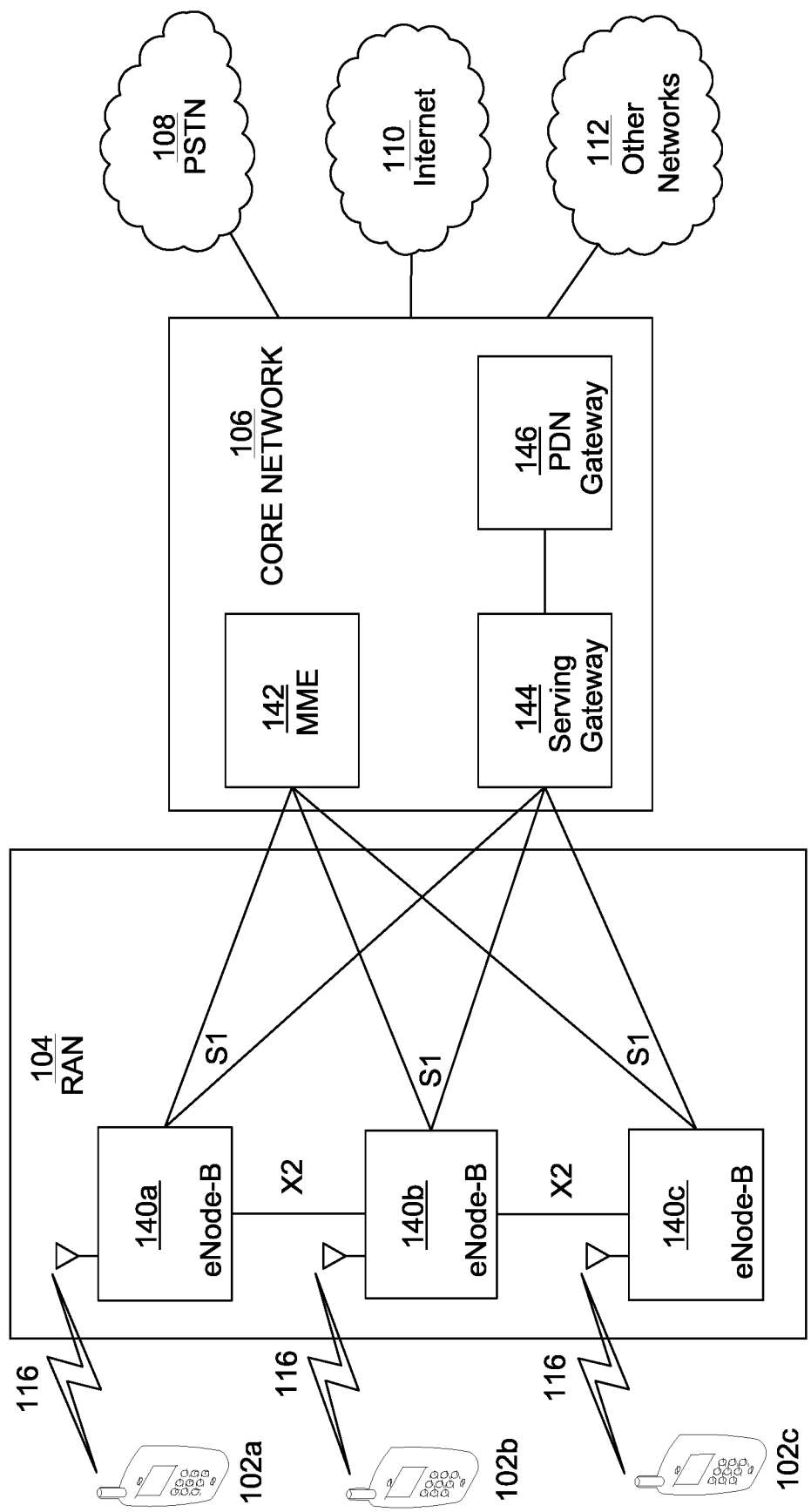
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In LTE, a WTRU may need to receive one or more of broadcasting signals for cell access such as a Master Information Block (MIB), System Information Blocks (SIBs) including an SIB Type 1 (SIB-1), an SIB Type 2 (SIB-2) and other subsequent SIBs.

An MIB may be transmitted on a Physical Broadcast Channel (PBCH) in subframe 0 with a Transmission Time Interval (TTI) of 40 milliseconds (ms) and may be repeated every 10 ms. The physical resource of the PBCH may be fixed and may be located within the 72 center subcarriers of the transmission band. The PBCH resource may be in the first 4 symbols of the second timeslot. The information contained in this block may include at least part of the System Frame Number (SFN) (for example, the 8 most significant bits of the SFN), configured downlink (DL) bandwidth of the cell and Physical Hybrid Automatic Repeat Request (ARQ) Indicator Channel (PHICH) configuration for the cell. By acquiring 1 of the 4 repeated MIBs in the 40 ms TTI, the WTRU may be able to derive the 2 least significant bits of the SFN for the full SFN value.

SIB-1 may be transmitted on a Physical Downlink Shared Channel (PDSCH) in subframe 5, may have a TTI of 80 ms, and may be repeated every 20 ms. The resource location of SIB-1 may be indicated by a Physical Downlink Control Channel (PDCCH) scrambled with a System Information-Radio Network Temporary Identifier (SI-RNTI). SIB-1 may provide information to a WTRU for use in order to access the cell and network, and scheduling information for the other SIBs.

SIB-2 may be transmitted on a PDSCH based on the scheduling information contained in SIB-1. The resource location may be indicated by a PDCCH scrambled by SI-RNTI. SIB-2 may provide information to a WTRU for use in order to access and initiate connectivity with the cell and network. The information in SIB-2 may include common channel configurations such as for Physical Random Access Channel (PRACH)/Random Access Channel (RACH), Multimedia Broadcast Single Frequency Network (MBSFN) subframe configuration and uplink (UL) information.

A scheduling information list for SI may be used by the WTRU for cell access. Each listed SI in the scheduling information list may contain one or more SIBs, with the exception of SIB-2 which may be included by itself in an SI-2. Scheduling of SIs may be based on periodicity of the system information and SI-window length. The eNode-B may have some flexibility in the time and frequency resource for sending other SIBs.

In an example using Frequency Division Duplex (FDD) DL scheduling, the WTRU may receive the scheduling grant for a DL transmission in the same subframe as the DL data, for example, the data in a PDSCH. The DL Hybrid ARQ (HARQ) protocol is asynchronous and adaptive, which means that there may be a PDCCH carrying a DL grant for every DL re-transmission. There may be a maximum of 8 DL HARQ processes per serving cell.

In an example using FDD UL scheduling, the WTRU may receive the scheduling grant for a UL transmission 4 subframes ahead of the actual UL transmission. For example, for a UL grant received in subframe n, the WTRU may transmit UL data, for example, data in a Physical Uplink Shared Channel (PUSCH), in subframe n+4. The UL HARQ protocol may be synchronous and may or may not be adaptive. Similar to DL HARQ operation, there may be a maximum of 8 UL HARQ processes per serving cell.

In an example, Time Division Duplex (TDD) scheduling timing may be the same as FDD scheduling timing. In a further example using UL scheduling and re-transmission timing, for TDD UL/DL configurations 1-6, upon detection by a WTRU of a PDCCH with uplink Downlink Control Information (DCI) format and/or a PHICH transmission in subframe n intended for that WTRU, the WTRU may adjust the corresponding PUSCH transmission in subframe n+k, with k given in Table 1, according to the PDCCH and PHICH information.

Further, for TDD UL/DL configuration 0, upon detection by a WTRU of a PDCCH with UL DCI format and/or a PHICH transmission in subframe n intended for that WTRU, the WTRU may adjust the corresponding PUSCH transmission in subframe n+k. Further, the WTRU may make this adjustment if the most significant bit (MSB) of the UL index in the PDCCH with UL DCI format is set to 1 or a PHICH is received in subframe 0 or subframe 5 in the resource corresponding to $I_{PHICH}=0$. Also, the WTRU may make this adjustment, with k given in Table 1, where $I_{PHICH}=1$ for TDD UL/DL configuration 0 with PUSCH transmission in subframe 4 or subframe 9, and $I_{PHICH}=0$, otherwise.

If, for TDD UL/DL configuration 0, the least significant bit (LSB) of the UL index in the DCI format 0/4 is set to 1 in subframe n, a PHICH is received in subframe 0 or subframe 5 in the resource corresponding to $I_{PHICH}=1$, or PHICH is received in subframe 1 or subframe 6, the WTRU may adjust the corresponding PUSCH transmission in subframe n+7. If, for TDD UL/DL configuration 0, both the MSB and LSB of the UL index in the PDCCH with UL DCI format are set in subframe n, the WTRU may adjust the corresponding PUSCH transmission in both subframes n+k and n+7, with k given in Table 1. Table 1 provides UL scheduling timing k for TDD configurations 0-6. As an example, for configuration 1, if a UL grant is received in the DL in subframe 1, then from the table k=6 and the grant may be for a PUSCH in subframe n+k=subframe 1+6=subframe 7.

TABLE 1

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | | 4 | | | | 4 | |
| 3 | 4 | | | | | | | 4 | 4 | |
| 4 | | | | | | | | | 4 | 4 |
| 5 | | | | | | | | | 4 | |
| 6 | 7 | 7 | | | | 7 | 7 | | | 5 |

In FDD, the DL HARQ timing mechanism may be based on a fixed offset to the actual PDSCH reception. In response to the reception of a PDSCH in subframe n by the WTRU, the WTRU may provide a DL HARQ (ACK (acknowledgement)/NACK (negative acknowledgement)) feedback (either via a PUCCH or PUSCH UL channels) in UL subframe n+4.

The UL HARQ timing in FDD is also similar to that of its DL. In response to the transmission of a PUSCH in subframe n by the WTRU, the WTRU may expect a UL HARQ (ACK/NACK) feedback via PHICH channel in DL subframe n+4.

In TDD, the DL HARQ timing mechanism may be based on a concept of a bundling window which consists of a set of DL subframes. The DL HARQ feedback bits corresponding to these DL subframes may be bundled together and sent to the eNode-B in the same UL subframe either via a PUCCH or a PUSCH. A UL subframe n may carry the DL HARQ feedback bits for M DL subframes where M>=1. Referring to Table 2, UL subframe n may carry the DL HARQ feedback bits of each DL subframe n-k, where k ∈ K may be a set of M elements $\{k_0, k_1, \ldots k_{M-1}\}$. M may be considered as the size of the bundling window in terms of DL subframes. Table 2 provides a DL association set index K: $\{k_0, k_1, \ldots k_{M-1}\}$ for TDD DL HARQ.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

As an example, for configuration 1, UL subframe n=2 may carry the DL HARQ feedback bits for the 2 subframes n-k where k=7 and k=6 which correspond to 2-7 and 2-6.

Since the frames are 10 subframes each, this corresponds to subframes 5 and 6 in the previous frame.

For PUSCH transmissions scheduled from a scheduling cell in subframe n, a WTRU may determine the corresponding PHICH resource of that scheduling cell in subframe $n+k_{PHICH}$, where $k_{PHICH}$ is given in Table 3. For a subframe bundling operation, the corresponding PHICH resource may be associated with the last subframe in the bundle. Table 3 provides $k_{PHICH}$ for TDD. As an example, for configuration 1, if the WTRU transmits a PUSCH in subframe 2, then it may expect a PHICH providing the UL HARQ-ACK feedback in subframe $n+k_{PHICH}$, i.e., subframe 2+4=subframe 6.

TABLE 3

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

In an enhanced coverage mode of operation, repetitions of UL and DL channels may be used. However, in a TDD cell or an enhanced Interference Mitigation and Traffic Adaptation (eIMTA) enabled cell, the repetitions of the UL or the DL channels may be limited since the TDD subframe configuration information may not be available when a WTRU receives the channels.

As used herein, a WTRU which may need to operate in a coverage enhanced mode of operation may also be referred to as a coverage limited WTRU, a WTRU in coverage enhanced (CE) mode, and a WTRU which may use repetitions of DL and UL channels for coverage enhancement, and such terms and phrases may be used interchangeably. Further, the examples described herein may be implemented in and are equally applicable to machine-type communications (MTC), including low cost-MTC (LC-MTC).

PBCH repetitions may be used for coverage enhancement in the DL subframes other than subframe 0. However, in TDD, the DL subframe configuration may be unknown until the WTRU receives SIB-1. As a consequence, the PBCH repetition may be limited to DL only subframes such as subframe 0 and subframe 5. Therefore, the coverage enhancement may be limited to a certain level due to the restriction of repetition to subframe 0 and subframe 5. This restriction may apply even though a larger number of DL subframes may be configured in the system.

In an example, PBCH repetition may be used with a predefined or predetermined special subframe configuration. The PBCH repetition may be used in subframe 1, subframe 6 or both in the Downlink Pilot Time Slot (DwPTS) region with a predetermined special subframe configuration. For example, a WTRU in a coverage enhanced mode of operation may assume that the PBCH is transmitted in subframe 1, subframe 6 or both in the DwPTS region and the special subframe configuration is predefined. Further, one or more of following examples may apply.

In an example, subframe 0 and subframe 5 may be used for PBCH repetition and subframe 1, subframe 6 or both may be used additionally for the PBCH repetitions. In a further example, the special subframe configuration for the PBCH repetition in subframe 1, subframe 6 or both may be fixed as a certain special subframe configuration. Further, the special subframe configuration having the minimum number of orthogonal frequency-division multiplexing (OFDM) symbols in the DwPTS region among the special subframe configurations other than the special subframe configuration 0 and 5 may be used. The special subframe configuration 9 may be used as the predetermined special subframe configuration for PBCH repetition. Also, the special subframe configuration may be predefined as one of the configurations which may have 9, 10, or 11 OFDM symbols in the DwPTS region. The number or set of OFDM symbols for the PDCCH may be predefined and the rest of OFDM symbols in the DwPTS region may be used for PBCH repetitions.

Figure 2:
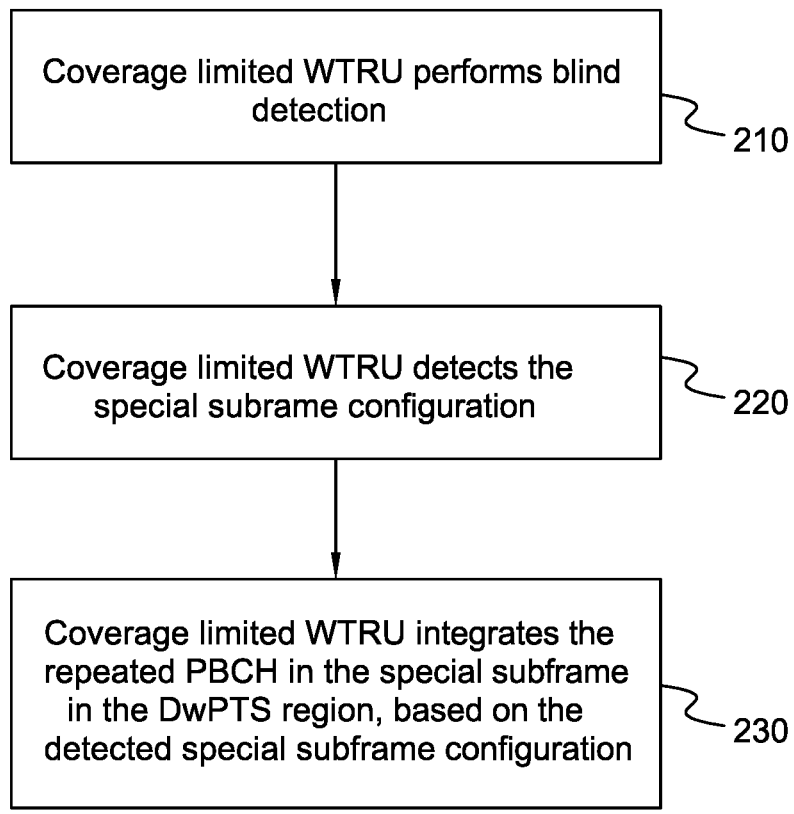
FIG. 2 is a diagram of an example procedure of a coverage limited WTRU performing blind detection of the special subframe configuration.

FIG. 2 is a diagram of an example procedure of a coverage limited WTRU performing blind detection of the special subframe configuration. In an example shown in procedure 200, a coverage limited WTRU may begin to perform blind detection 210. As a result, a special subframe configuration for the PBCH repetition may be blindly detected by the coverage limited WTRU 220. In an example, a coverage limited WTRU may perform blind detection of the special subframe configuration before it starts PBCH reception. Based on the detected special subframe configuration, the coverage limited WTRU may integrate the repeated PBCH in the special subframe in the DwPTS region 230.

In a further example, multiple PBCH repetition candidates may be defined. A coverage limited WTRU may perform blind detection of two or more PBCH repetition hypotheses. In an example, the set of subframes {0, 5} may be used for PBCH repetition in all PBCH repetition candidates and other subframes may be used in another PBCH repetition candidate. Further, one or more of following examples may apply.

Two or more examples of a PBCH repetition hypothesis may be defined with combinations of the set of subframes {0, 1, 5, 6} and/or special subframe configurations. For example, a coverage limited WTRU may perform multiple decoding attempts with different PBCH repetition candidates in parallel. In this case, one or more of following PBCH repetition candidates may be used.

The set of subframes {0, 5} may be used in all PBCH repetition candidates. Further, in a PBCH repetition candidate, the subframe 0 may be only used for PBCH repetition. Also, in a PBCH repetition candidate, the set of subframes {0, 5} may be only used for PBCH repetition. In addition, in one or more PBCH repetition candidates, the set of subframes {1, 6} may be additionally used for PBCH repetition. For example, in a PBCH repetition candidate, the set of subframes {1, 6} may be used for PBCH repetition with a certain special subframe configuration which may have 9 OFDM symbols in the DwPTS region (for example, special subframe configuration 1, 6 or both). Further, in a PBCH repetition candidate, the subframes {1, 6} may be used for PBCH repetition with a certain special subframe configuration which may have 10 OFDM symbols in the DwPTS region (for example, special subframe configuration 2, 7 or both). Also, in a PBCH repetition candidate, the set of subframes {1, 6} may be used for PBCH repetition with a certain special subframe configuration which may have 11 OFDM symbols in the DwPTS region (for example, special subframe configuration 3, 8 or both). In addition, in a PBCH repetition candidate, the set of subframes {1, 6} may be used for PBCH repetition with a certain special subframe configuration which may have 12 OFDM symbols in the DwPTS region (for example, special subframe configuration 4).

In a further example, two or more of PBCH repetition hypothesis may be defined with combinations of the set of subframes {0, 1, 5, 6, 9} and special subframe configurations. In this case, one or more of following PBCH repetition candidates may be used.

The set of subframes {0, 5} may be used in all PBCH repetition candidates. In another example, in one or more PBCH repetition candidate, subframe {9} may be used additionally for PBCH repetition. Also, in a PBCH repetition candidate, subframe {0} may be only used for PBCH repetition. Further, in a PBCH repetition candidate, the set of subframes {0, 5} may be only used for PBCH repetition. In one or more PBCH repetition candidates, the set of subframes {1, 6} may be additionally used for PBCH repetition. In a further example, two or more of PBCH repetition hypothesis may be defined with combinations of any subset of DL subframes, special subframes or both.

SIB-1 repetitions may be used for coverage enhancement in the DL subframes other than subframe 5 in even numbered SFN. However, in TDD, the DL subframe configuration may be unknown until the WTRU receives SIB-1. As a consequence, the SIB-1 repetition may be limited to DL only subframes such as subframes 0 and 5. Therefore, the coverage enhancement may be limited to a certain level due to the restriction of repetition to subframes 0 and 5. This restriction may apply even though a larger number of DL subframes may be configured in the system.

In an example, SIB-1 may be transmitted in a predefined location. The (E)PDCCH (an enhanced PDCCH or a PDCCH) scrambled with SI-RNTI associated with the SI-message containing SIB-1 may be transmitted repetitively in the predefined (E)PDCCH candidate. Therefore, a coverage limited WTRU may integrate (E)PDCCH associated with SIB-1 without multiple blind decoding attempts. For example, the (E)PDCCH for SIB-1 may be transmitted in a predefined (E)PDCCH candidate in the (E)PDCCH common search space in subframe 5 in an even numbered radio frame (or an even numbered SFN). In this case, one or more of following examples may apply.

A coverage limited WTRU may assume that the (E)PDCCH for SIB-1 scheduling may be transmitted in the first (E)PDCCH candidate with the maximum aggregation level in the (E)PDCCH common search space. Further, the coverage limited WTRU may assume that the same (E)PDCCH for SIB-1 scheduling may be transmitted within a predefined period (e.g. modification period). In another example, the coverage limited WTRU may assume that the same (E)PDCCH for SIB-1 scheduling may be transmitted.

In a further example, a coverage limited WTRU receives the associated (E)PDCCH for the SI-message containing SIB-1 over one or more subframes and the WTRU may assume that the PDSCH resource allocation information may be the same during a predefined period. In an example, a coverage limited WTRU may integrate a (E)PDCCH candidate in the (E)PDCCH common search space until it successfully decodes the (E)PDCCH associated with the SI-message containing SIB-1. Then, the WTRU may assume that PDSCH containing SI-message containing SIB-1 may be transmitted in the same location in the repetition window. The repetition window may be defined for both (E)PDCCH and PDSCH for the SI-message containing SIB-1 and the repetition window may be described as one of the following: multiples of a predefined modification period, a SFN cycle (1024 ms) or multiples of 80 ms (for example, $N_{rep} \times 80$ ms, where $N_{rep}$ may be predefined or configurable).

In a further example, a coverage limited WTRU may assume that the (E)PDCCH associated with SIB-1 may be transmitted in the first (E)PDCCH candidate for each aggregation level. For example, the first PDCCH candidate with aggregation level 4 and the first PDCCH candidate with aggregation level 8 in the common search space may be the PDCCH associated with SIB-1. Therefore, the WTRU may perform two blind decoding attempts.

In a further example, the PDSCH with SI-message containing SIB-1 and the associated (E)PDCCH may be transmitted repetitively in the DL subframe other than the subframe 5 in even-numbered radio frame. The subframes used for PBCH repetition may be used for the repetition of SIB-1 transmission. In this case, a coverage limited WTRU may assume that the (E)PDCCH and PDSCH for SIB-1 may be transmitted in the subframe containing PBCH repetition. The PDSCH containing SIB-1 may be transmitted in subframe 5 in an odd-numbered radio frame as well. Therefore, subframe 5 may contain SIB-1 irrespective of the radio frame number.

In another example, a TDD transmission and/or reception signal window may be indicated as one or a combination of the following values. In an example, an integer value may indicate a set, for example a number, of consecutive subframes regardless of whether they are considered to be UL or DL subframes. For the UL signal, the WTRU may transmit only in the UL subframes of that set of subframes, possibly indicated by the UL subframe reference TDD UL/DL configuration. For the DL signal, the WTRU may receive only in the DL subframes of that set of subframes, possibly indicated by the DL subframe reference TDD UL/DL configuration. In a further example, an integer value may indicate a set, for example an integer number, of consecutive DL subframes observed by the WTRU, possibly indicated by the DL subframe reference TDD UL/DL configuration. The WTRU may count the number of DL subframes and may not count any UL subframe. In a further example, an integer value may indicate a set, for example an integer number, of consecutive UL subframes observed by the WTRU, possibly indicated by the UL subframe reference TDD UL/DL configuration. The WTRU may count the number of UL subframes and may not count any DL subframe. In a further example, an integer value may indicate a set, for example a number, of consecutive transmission and/or reception opportunities corresponding to one or more HARQ processes.

In a further example, after a WTRU receives the last (E)PDCCH of repetitions in the subframe (n), possibly carrying the DL grant, the WTRU may expect the PDSCH, possibly the first of several, in subframe (n+k), where the parameter (k) may be one or a combination of the following values. The value may be a fixed value or a value preconfigured by a higher layer. Also, the value may be equal to the one used for TDD UL scheduling procedures, where the UL grant may be received in subframe (n) and the UL data may be transmitted in subframe (n+k). Further, the value may be a function of the subframe where the last grant is received and/or reference TDD UL/DL configuration used for UL and/or DL HARQ processes.

In a further example, after a WTRU receives the last (E)PDCCH of repetitions in the subframe (n), the WTRU may expect the PDSCH, possibly the first of several, in (k) DL subframes after subframe (n). The value of the parameter (k) may be one or a combination of the following values. The value may be a fixed value or a value preconfigured by a higher layer. Also, the value may be a function of the subframe where the last grant is received and/or reference TDD UL/DL configuration used for UL and/or DL HARQ processes.

In a further example, after a WTRU receives the last PDSCH in subframe (n), the WTRU may transmit the DL HARQ ACK/NACK, possibly through PUCCH or PUSCH, in subframe (n+k), where the value of (k) and allocated resources may correspond to the TDD DL HARQ ACK/NACK procedures for a single PDSCH reception (for example, the case with no repetition) in subframe (n) according to the reference TDD UL/DL configuration used for UL HARQ processes, for example, TDD UL/DL configuration indicated in SIB-1. For a particular DL HARQ process, the start of the PUCCH transmission window may be implicitly and/or explicitly indicated by the first PUCCH transmission. For example, the PUCCH transmission window may start (k) subframes after the last corresponding PDSCH reception (e.g., the end of PDSCH reception window).

A window size may be a function of the HARQ process. For example, different window sizes may be explicitly and/or implicitly indicated for different TDD UL HARQ processes (or a UL HARQ process number, or a number of a UL HARQ process) to make sure that all HARQ related signals have the same number of reception and/or transmission opportunities. This may be used, e.g., to possibly guarantee that the same number of actual transmissions, receptions or both is used for all HARQ related signals.

For DL reception (e.g., PDSCH, (E)PDCCH, PHICH, etc.) the WTRU may only consider a subset of DL subframes, e.g., which may correspond to one or more HARQ processes. For UL transmission (e.g., PUSCH, PUCCH, etc.) the WTRU may only considers a subset of UL subframes, e.g., which may correspond to one or more HARQ processes.

A set of transmission and/or reception opportunities of a UL HARQ process may be determined as one or a combination of the following opportunities. In an example, UL grant opportunities may be carried by (E)PDCCH. UL grant reception opportunities of a UL HARQ process may correspond to DL subframes where the WTRU may interprets all received grants, including the initial UL grant, re-transmission UL grants, or both for the same UL HARQ process. In a further example, PUSCH transmission opportunities of a UL HARQ process may correspond to UL subframes where the WTRU may transmit and/or re-transmit the PUSCH for the same UL HARQ process (or the same UL HARQ process number). In a further example, PHICH reception opportunities of a UL HARQ process may correspond to DL subframes where the WTRU may interpret all received PHICH signals for the same UL HARQ process.

In an example, after a WTRU receives the last (E)PDCCH of repetitions in the subframe (n), possibly carrying the UL grant, the WTRU may transmit the granted PUSCH in subframe (n+k). The value of (k) may correspond to the TDD UL PUSCH timing for a single PUSCH transmission in subframe (n) according to the reference TDD UL/DL configuration used for UL HARQ processes, for example, TDD UL/DL configuration indicated in SIB-1.

For a particular UL HARQ process the start of the PUSCH transmission window may be implicitly and/or explicitly indicated by the first PUSCH transmission. For example, the PUSCH transmission window may start (k) subframes after the last corresponding (E)PDCCH reception (for example, the end of (E)PDCCH reception window).

In an example, after a WTRU transmits the last PUSCH of repetitions in subframe (n), the WTRU may expect to receive the UL HARQ ACK/NACK, possibly through PHICH, in subframe (n+k). The value of (k) and allocated resources may correspond to the TDD UL HARQ ACK/NACK procedures for a single PUSCH transmission (for example, PUSCH with no repetition) in subframe (n) according to the reference TDD UL/DL configuration used for UL HARQ processes, for example, TDD UL/DL configuration indicated in SIB-1.

For a particular DL HARQ process the start of the PHICH reception window may be implicitly and/or explicitly indicated by the first PHICH reception. For example, the PHICH reception window may start (k) subframes after the last corresponding PUSCH transmission (for example, the end of PUSCH transmission window).

The TDD UL/DL subframe configuration (for example, of a cell) may be changed dynamically in an eIMTA capable TDD network. The reconfiguration PDCCH using eIMTA-Radio Network Temporary Identifier (eIMTA-RNTI) may be transmitted within a radio frame without repetition and a coverage limited WTRU may not receive the reconfiguration PDCCH. As a result, the coverage limited WTRU may not follow the dynamic UL/DL subframe configuration.

A coverage limited WTRU may or may need to transmit one or more UL channels (for example, PUCCH, PUSCH and the like) with repetitions in the UL subframes. If the UL subframe configuration is changed during a UL transmission with repetition, a coverage limited WTRU may transmit a UL signal in a subframe that may be reconfigured as a DL subframe. The result may be interference for a WTRU receiving a DL signal in the reconfigured subframe.

As used herein, eIMTA-enabled TDD network, eIMTA-enabled network, eIMTA-enabled cell and eIMTA-enabled eNode-B may be used interchangeably. As used herein, enabled and capable may be used interchangeably. An eIMTA-enabled cell may be a cell using (or which may use) a dynamic TDD UL/DL subframe configuration. As used herein, network, eNode-B and cell may be used interchangeably.

A TDD UL/DL subframe configuration may include one or more of uplink, downlink, and special subframe configurations. For example, a TDD UL/DL subframe configuration may identify one or more subframes, for example, in a frame, as UL, DL, or special subframes. A special subframe may be a TDD subframe which may include one or more of a DL part, a UL part and a gap. A special subframe may enable a transition from DL to UL. As used herein, TDD UL/DL subframe configuration, TDD configuration, TDD subframe configuration, UL/DL subframe configuration, and UL/DL TDD subframe configuration may be used interchangeably.

A cell (for example, an eIMTA-enabled cell) may provide or identify a first (for example, a cell-specific) TDD UL/DL subframe configuration, for example, in system information (for example, SIB-1) which the cell may broadcast. The cell may provide or identify a second TDD UL/DL subframe configuration to one or more WTRUs, for example, via dedicated signaling, for example, RRC signaling. The UL subframes of the second TDD UL/DL subframe configuration may be a subset of the UL subframes of the first TDD UL/DL subframe configuration. The cell may provide or indicate a third TDD UL/DL subframe configuration via physical layer signaling, for example via a PDCCH (or DCI) masked with an RNTI which may be referred to as an eIMTA-RNTI. At least the UL subframes of the first UL/DL subframe configuration that are DL subframes in the second UL/DL subframe configuration may be considered flexible subframes. The third configuration may or may be used to determine (for example, dynamically) the direction and/or type (for example, unidirectional or special subframe) of the flexible subframes. A PDCCH masked with eIMTA-RNTI may be referred to as a reconfiguration PDCCH.

A PDCCH or DCI masked or scrambled with an RNTI may mean the CRC of the PDCCH or DCI is masked or scrambled with the RNTI. As used herein, DCI and PDCCH may be used interchangeably. As used herein, masked and scrambled may be used interchangeably.

As used herein, an eIMTA-WTRU may be or may refer to a WTRU that may have eIMTA capability, may support and/or use eIMTA, and/or may be supported in an eIMTA-enabled cell. An eIMTA-WTRU may support and/or use CE mode of operation. An eIMTA WTRU that may support, use, or be in a CE mode of operation may be referred to as an eIMTA-WTRU, an eIMTA-CE-WTRU, an eIMTA-WTRU with CE, and/or a CE-eIMTA-WTRU. Coverage enhanced mode of operation may be interchangeably used with enhanced coverage mode. CE mode of operation may use or involve repetition of one or more physical channels.

As used herein, the reconfiguration PDCCH masked with eIMTA-RNTI, eIMTA-PDCCH, reconfiguration PDCCH, eIMTA-DCI, and TDD-PDCCH, may be used interchangeably.

A DL resource for repetition may be or include one or more DL subframes that may be used for DL signal repetition or DL channel repetition. A DL resource for repetition may be or include one or more DL subframes that may be used for coverage enhanced mode of operation. A UL resource for repetition may be or include one or more UL subframes that may be used for UL signal repetition or UL channel repetition. A UL resource for repetition may be or include one or more UL subframes that may be used for coverage enhanced mode of operation.

An eIMTA-WTRU may use (or fall back to) a default TDD mode of operation in an eIMTA-enabled cell if the eIMTA-WTRU is in or using a coverage enhanced mode of operation (e.g., using and/or needing repetitions of uplink and/or downlink channels). In some embodiments and examples, default and legacy may be used interchangeably.

An eIMTA-WTRU that may be in a normal coverage mode of operation (for example, not using and/or not needing repetitions of uplink and/or downlink channels), may use one or more of: (i) a (for example, a first) TDD subframe configuration (for example, a TDD subframe configuration signaled in SIB-1) for UL HARQ timing (for example, HARQ process timing associated with UL transmission such as PUSCH transmission); (ii) a (for example, a second) TDD subframe configuration (for example, a TDD subframe configuration signaled via higher layer Radio Resource Control (RRC) signaling) for DL HARQ timing (for example, HARQ process timing associated with DL transmission such as PDSCH transmission); and/or a (for example, a third) TDD subframe configuration (for example, a TDD subframe configuration signaled in a reconfiguration PDCCH with CRC scrambled with an eIMTA-RNTI) for the subframe directions (and/or type) for transmission and/or reception (for example, for PDSCH reception and/or PUSCH transmission). The WTRU may use the first TDD subframe configuration (for example, the TDD subframe configuration signaled in SIB-1) for UL and DL communication (for example, all UL and DL communication) if the eIMTA-WTRU performs CE mode operations and/or is in a CE mode of operation. Use of a TDD subframe configuration for UL and DL communication may include using the subframe directions and/or type (for example, unidirectional or special subframe) as designated in the TDD subframe configuration. Use of a TDD subframe configuration for UL and DL communication may include using the HARQ scheduling and timing relationships for UL and DL (for example, UL and DL HARQ processes) according to the TDD subframe configuration.

In some embodiments and examples, UL and DL may be replaced with UL or DL (for example, in a cell that only supports UL or DL) and still be consistent with this disclosure.

An eIMTA-WTRU configured with CE mode and/or operating in CE mode may perform or use legacy WTRU behavior in an eIMTA-enabled TDD network. For example, an eIMTA-WTRU may use or fall back to a default (for example, legacy) TDD mode of operation if (and/or when) the eIMTA-WTRU is configured for or with (and/or operating in) a coverage enhanced mode of operation. The default TDD mode of operation may be TDD operation using the first TDD subframe configuration (for example, a TDD subframe configuration signaled in the SIB-1) for UL and/or DL communication (for example, all UL and DL communication).

An eIMTA-WTRU may (or may not) use or fall back to a default TDD mode of operation if the eIMTA-WTRU may be configured with (and/or operating in) a coverage enhanced mode of operation in an eIMTA-enabled cell and one or more conditions are satisfied. In an example, a condition (for example, for default TDD operation) may be satisfied if and/or when an eIMTA reconfiguration periodicity is smaller than (or equal to) a predefined threshold. If the eIMTA reconfiguration periodicity is smaller than (or equal to) a certain time value (for example, 20 ms), the eIMTA-WTRU may use or fall back to the default TDD mode of operation. Otherwise, the eIMTA-WTRU may use the first, second, and third TDD subframe configurations (for example, operate according to the rules of eIMTA).

In another example, a condition (e.g., for default TDD operation or not using or falling back to default TDD operation) may be satisfied if the coverage enhancement level (CE level) or repetition level or repetition number the eIMTA-WTRU may be configured with (and/or operating with) is lower (or higher) than a predefined value (e.g., a predefined CE level, repetition level, or repetition number). For example, multiple CE levels (e.g. 4 CE levels) may be defined. A first CE level (e.g. CE level 1) may have or correspond to a smaller number of repetitions than a second CE level (e.g. CE level 2). A lower CE level may be a CE level that uses a smaller number of repetitions and a higher CE level may be a CE level that uses a larger number of repetitions. If an eIMTA-WTRU is configured with (and/or operating with) a certain CE level (e.g., CE level 1) which is lower than the predefined CE level (e.g., CE level 3), then the eIMTA-WTRU may use the first, second, and third TDD subframe configurations for uplink and downlink transmission (e.g., operate according to the rules of eIMTA). Otherwise, the eIMTA-WTRU may use a default TDD mode of operation. In an example, an eIMTA-WTRU may use or fall back to a default TDD mode of operation if the eIMTA reconfiguration periodicity is smaller than a predefined threshold and the configured CE level of the eIMTA-WTRU (or the CE level the eIMTA-WTRU is operating with) is higher than the predefined threshold.

The default TDD mode of operation (e.g., for coverage enhanced WTRUs) may be defined differently according to the eNode-B eIMTA capability or usage. For example, the default TDD mode of operation for an eIMTA-enabled eNode-B and an eIMTA-disabled eNode-B may be different.

In (or for) the default TDD mode of operation for an eIMTA-enabled eNode-B, the DL resources which may be used for repetition may be or may include one or more (e.g., all) of the DL subframes and zero, one or more (e.g., all) of the special subframes in (e.g., indicated in or by) the cell-specific TDD subframe configuration, e.g., the TDD subframe configuration signaled in SIB-1. The UL resources which may be used for repetition may be (e.g., may be limited to or only to) the UL subframe which may be a UL subframe always irrespective of the TDD subframe configuration (e.g., subframe #2).

An eIMTA-disabled eNode-B may not activate eIMTA operation or may not have eIMTA capability. In (or for) the default TDD mode of operation for an eIMTA-disabled eNode-B, the DL resources which may be used for repetition may be or may include one or more (e.g., all) of the DL subframe(s) and zero, one or more (e.g., all) of the special subframes in (e.g., indicated in or by) the cell-specific TDD subframe configuration, e.g., the TDD subframe configuration signaled in SIB-1. The UL resources which may be used for repetition may be or may include one or more (e.g., all) of the UL subframes indicated by the cell-specific TDD subframe configuration, e.g., the TDD subframe configuration signaled in SIB-1.

A WTRU (e.g., eIMTA-WTRU) which may be configured with or operating in a CE mode may transmit and/or receive repetitions in the default TDD mode of operation differently for (e.g., when communicating with) an eIMTA-enabled eNode-B and an eIMTA-disabled eNode-B. For example, the WTRU may transmit and/or receive repetitions according to the DL and/or UL resources available or used for repetitions described herein for eIMTA-enabled and eIMTA-disabled eNode-Bs.

A UL resource indication for repetitions may be provided and/or used.

A WTRU (which may or may not have eIMTA capability) may use DL subframes and possibly at least part of special subframes (e.g., DwPTS) according to a first TDD subframe configuration (e.g., TDD subframe configuration signaled in an SIB-1) for the repetition of DL signals in the coverage enhanced mode of operation. The WTRU may use UL subframes and possibly at least part of special subframes (e.g., Uplink Pilot Time Slot (UpPTS)) according to a second TDD subframe configuration (e.g., another TDD subframe configuration). One or more of following procedures may apply for the repetition of UL signals in the coverage enhanced mode of operation.

The TDD subframe configuration which may contain the UL resource indication (e.g., the second TDD subframe configuration) may be signaled via higher layer signaling such as RRC signaling or system information (e.g., in a SIB). The TDD subframe configuration for UL resource indication may be independent from the TDD subframe configuration which may contain the DL resource indication (e.g., the first TDD subframe configuration).

The WTRU may use one (e.g., the first) TDD subframe configuration (e.g., a TDD subframe configuration signaled in SIB-1) for both DL and UL resource indication. The TDD subframe configuration may be used for UL resource configuration with a UL subframe subset restriction. For example, the eNB may restrict a subset of UL subframes configured or indicated by the TDD subframe configuration for coverage enhanced mode of operation. For example, a predefined table (or a look-up table) which may include one or more subset restriction patterns may be used for UL subframe restriction indication. In another example, a (e.g., another) TDD subframe configuration may be used for UL subframe restriction. For example, if TDD subframe configuration 0 is signaled for the first TDD subframe configuration (e.g., via the SIB-1) and TDD subframe configuration 1 is signaled for the second TDD subframe configuration as a UL subframe restriction, the non-overlapped UL subframes (for example, the set of subframes {4, 9}) may be restricted in the coverage enhanced mode of operation. The restricted UL subframes may not be used for repetition. In another example, a Random Access Response (RAR) message may include the TDD subframe configuration for the UL resource indication or the UL subframe restriction information in the coverage enhanced mode of operation.

The first TDD subframe configuration (e.g., the TDD subframe configuration in SIB-1) may be used for (e.g., to indicate the resources for) UL repetition as well as DL repetition, for example if the serving cell is not an eIMTA-enabled cell.

The second TDD subframe configuration for UL resource configuration (or UL resource indication) may be (or may only be) used for a coverage enhanced mode of operation.

In the embodiments and examples described herein, SIB-1 is used for exemplary purposes. Another SIB, other system information, other broadcast signaling, and/or other signaling may be used instead and still be consistent with the examples disclosed herein.

A WTRU, for example a WTRU in or using a CE mode or CE level, may use repetition in DL only and UL only subframes or in subframes (or partial subframes such as parts of special subframes) which may not switch direction, for example in an eIMTA-enabled cell.

In an example, an eIMTA-WTRU in a coverage enhanced mode of operation may assume or understand that DL subframes, special subframes or both in a first TDD subframe configuration (e.g., TDD UL/DL subframe configuration signaled in SIB-1) may be used for DL signal repetition. The WTRU may assume or understand that UL subframes, special subframes or both in a second TDD subframe configuration (e.g., TDD UL/DL subframe configuration signaled in higher layer RRC signaling) may be used for UL signal repetitions. The first and the second TDD subframe configurations may be provided by an eNode-B to a WTRU via separate or different downlink signaling (e.g., the first TDD subframe configuration via system information that may be broadcast and the second TDD subframe configuration in WTRU-specific higher layer signaling). In another example, the first and the second TDD subframe configurations may be provided in the same type of signaling (e.g., broadcast or dedicated higher layer signaling). Transmission via a broadcast channel (e.g., a physical broadcast channel or MIB) may be substituted for system information, broadcast, or higher layer signaling and vice versa and still be consistent with this disclosure.

An eIMTA-WTRU in a coverage enhanced mode of operation in an eIMTA-enabled cell may receive DL resource information (e.g., subframes or DL subframes for DL signal repetitions) in the first TDD subframe configuration (e.g. TDD UL/DL subframe configuration signaled in SIB-1). An eIMTA-WTRU may receive UL resource information (e.g., subframes or UL subframes for UL signal repetitions) in the second TDD subframe configuration (e.g., TDD UL/DL subframe configuration signaled in higher layer RRC signaling). The first and the second TDD subframe configurations may be different and/or the first TDD subframe configuration may contain a larger number of UL subframes than the second TDD subframe configuration. If the eIMTA-WTRU is in an eIMTA-disabled cell, the eIMTA-WTRU may receive both DL and UL resource information in the first TDD subframe configuration (e.g., UL/DL TDD subframe configuration signaled in the SIB-1).

Figure 3:
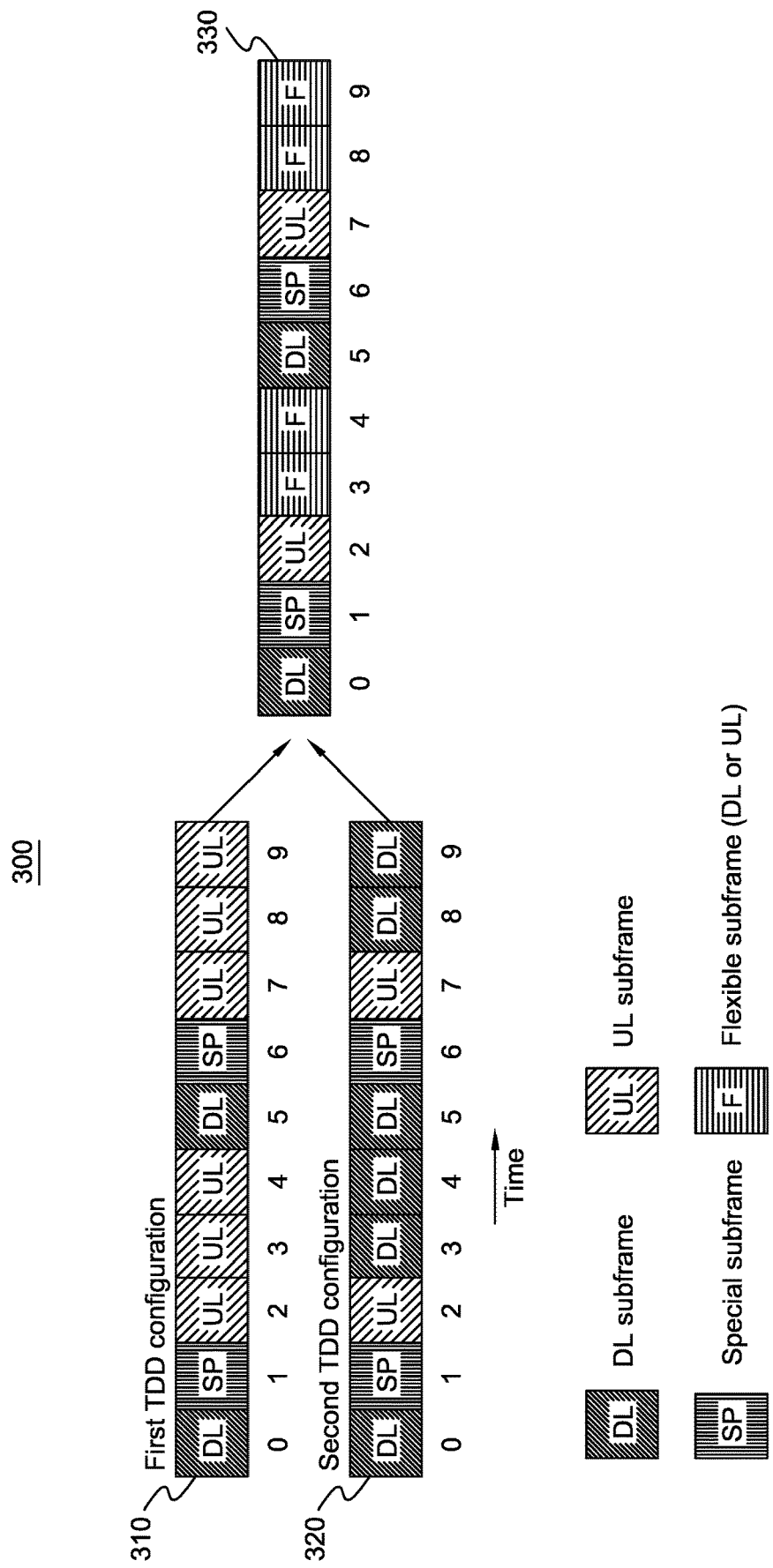
FIG. 3 is a diagram of an example of a radio frame for a WTRU using coverage enhancement in Time Division Duplex (TDD), wherein the uplink, downlink, and special subframes within the radio frame are based on a first TDD UL/DL subframe configuration and a second TDD UL/DL subframe configuration.

FIG. 3 is a diagram of an example of a radio frame for a WTRU using coverage enhancement in TDD, wherein the uplink, downlink, and special subframes within the radio frame for a WTRU using coverage enhancement are based on a first TDD UL/DL subframe configuration and a second TDD UL/DL subframe configuration. As shown in 300, the WTRU may receive a first TDD UL/DL subframe configuration 310. In an example, the first TDD UL/DL subframe configuration may be configuration 0. The first TDD UL/DL subframe configuration 310 may include two subframes as DL subframes, such as subframe 0 and subframe 5, six subframes as UL subframes, such as subframe 2, subframe 3, subframe 4, subframe 7, subframe 8 and subframe 9, and two subframes as special subframes, such as subframe 1 and subframe 6. The WTRU may also receive a second TDD UL/DL subframe configuration 320. In an example, the second TDD UL/DL subframe configuration may be configuration 5. The second TDD UL/DL subframe configuration 320 may include two subframes as UL subframes, such as subframe 2 and subframe 7, six subframes as DL subframes, such as subframe 0, subframe 3, subframe 4, subframe 5, subframe 8 and subframe 9, and two subframes as special subframes, such as subframe 1 and subframe 6.

In addition, the WTRU may then determine the UL (or UL only) subframes in which UL signals may be transmitted with repetitions and the DL (or DL only) subframes in which DL signals may be transmitted with repetitions in a radio frame based on the two received TDD UL/DL subframe configurations. The UL (or UL only) subframes may include the UpPTS of the determined special subframe(s). The DL (or DL only) subframes may include the DwPTS of the determined special subframe(s).

For example, the frame 330 may include two subframes as DL (or DL only) subframes, such as subframe 0 and subframe 5, two subframes as UL (or UL only) subframes, such as subframe 2 and subframe 7, four subframes as flexible subframes, such as subframe 3, subframe 4, subframe 8 and subframe 9, and two subframes as special subframes, such as subframe 1 and subframe 6. The DL subframes in frame 330 may be based on the first TDD UL/DL subframe configuration 310. The UL subframes in frame 330 may be based on the second TDD UL/DL subframe configuration 320.

The WTRU may determine one or more subframes to use for receiving DL repetitions of a DL signal in a radio frame 330 based on the first TDD UL/DL subframe configuration 310, e.g., based on the DL subframes of the first TDD UL/DL subframe configuration 310. In another example, the WTRU may determine one or more subframes to use for receiving DL repetitions of a DL signal in a radio frame 330 based on the DL subframes and special subframes (or DwPTS of the special subframes) of the first TDD UL/DL subframe configuration 310.

The WTRU may determine one or more subframes to use for transmitting UL repetitions of a UL signal in a radio frame 330 based on the second TDD UL/DL subframe configuration 320, e.g., based on the UL subframes of the second TDD UL/DL subframe configuration 320. In another example, the WTRU may determine one or more subframes to use for transmitting UL repetitions of a UL signal in a radio frame 330 based on the UL subframes and the special subframes (or UpPTS of the special subframe) of the second TDD UL/DL subframe configuration 320.

The WTRU may receive DL repetitions of a DL signal on (e.g., only on) the determined one or more subframes to use for receiving DL repetitions in a radio frame 330. The WTRU may transmit UL repetitions of a UL signal on (e.g., only on) the determined one or more subframes for transmitting UL repetitions in a radio frame 330.

The DL subframes of the first TDD UL/DL subframe configuration may be a subset of the DL subframes of the second TDD UL/DL subframe configuration. For example, as shown in 300, the DL subframes, in the first TDD UL/DL subframe configuration 310, subframe 0 and subframe 5, are a subset of the DL subframes of the second TDD UL/DL subframe configuration 320, subframe 0, subframe 3, subframe 4, subframe 5, subframe 8 and subframe 9.

The UL subframes of the second TDD UL/DL subframe configuration may be a subset of the UL subframes of the first TDD UL/DL subframe configuration. For example, as shown in 300, the UL subframes in the second TDD UL/DL subframe configuration 320, subframe 2 and subframe 7, are a subset of the UL subframes of the first TDD UL/DL subframe configuration 310, subframe 2, subframe 3, subframe 4, subframe 7, subframe 8 and subframe 9.

In an example, the WTRU may receive repetitions of a DL signal on (e.g., only on) the DL subframes of the first TDD UL/DL subframe configuration 310 (or the DL subframes in the frame 330 which may use the DL subframes of the first TDD UL/DL subframe configuration 310). For example, subframe 0 and subframe 5 of the first TDD UL/DL subframe configuration 310 (and/or the frame 330) are DL subframes, and the WTRU may receive repetitions of a DL signal on (e.g., only on) these subframes, subframe 0 and subframe 5.

In another example, the WTRU may transmit repetitions of a UL signal on (e.g., only on) the UL subframes of the second TDD UL/DL subframe configuration 320 (or the UL subframes in the frame 330 which may use the UL subframes of the second TDD UL/DL subframe configuration 320). For example, subframe 2 and subframe 7 of the second TDD UL/DL subframe configuration 320 (and/or the frame 330) are UL subframes, and the WTRU may transmit repetitions of a UL signal on (e.g., only on) these subframes, subframe 2 and subframe 7.

In a further example, the WTRU may receive repetitions of a DL signal on both the DL subframes and the special subframes (or DwPTS of the special subframes) of the first TDD UL/DL subframe configuration 310 (or the DL subframes and special subframes in the frame 330 which may use the DL subframes and special subframes of the first TDD UL/DL subframe configuration 310). For example, in the first TDD UL/DL subframe configuration 310 (and/or the frame 330), subframe 0 and subframe 5 are DL subframes and subframe 1 and subframe 6 are special subframes, and the WTRU may receive repetitions of a DL channel on these subframes, subframe 0, subframe 1, subframe 5 and subframe 6.

In yet another example, the WTRU may transmit repetitions of a UL signal on both the UL subframes and the special subframes (or UpPTS of the special subframes) of the second TDD UL/DL subframe configuration 320 (or the UL subframes and special subframes in the frame 330 which may use the UL subframes and special subframes of the second TDD UL/DL subframe configuration 320). For example, in the second TDD UL/DL subframe configuration 320 (and/or the frame 330), subframe 2 and subframe 7 are UL subframes and subframe 1 and subframe 6 are special subframes, and the WTRU may transmit repetitions of a UL channel on these subframes, subframe 1, subframe 2, subframe 6 and subframe 7.

Figure 4:
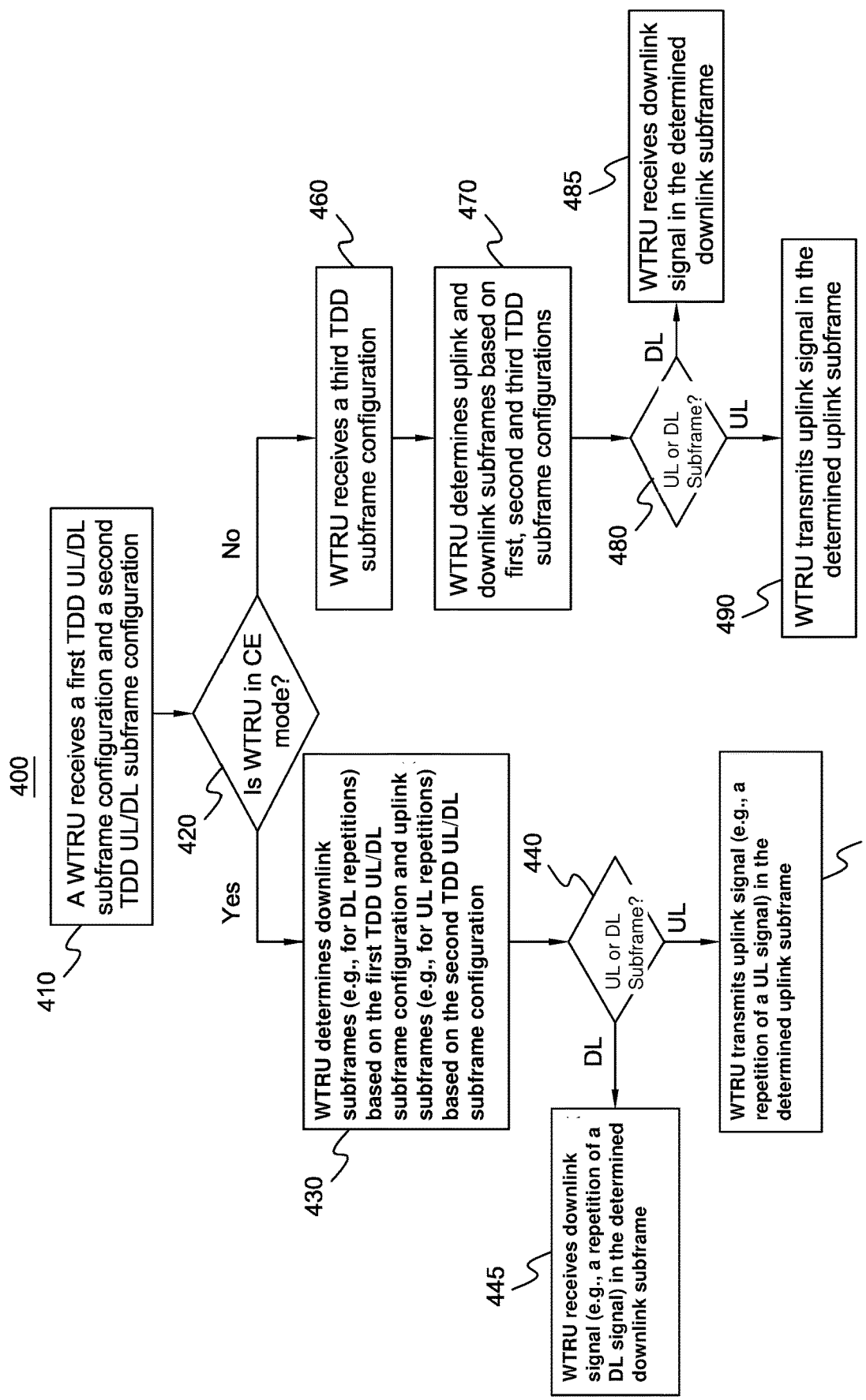
FIG. 4 is a diagram of an example procedure of a WTRU using at least one of coverage enhancement and enhanced Interference Mitigation and Traffic Adaptation (eIMTA) in TDD.

FIG. 4 is a diagram of an example procedure of a WTRU using at least one of coverage enhancement and eIMTA in TDD. As shown in the procedure 400, a WTRU may receive a first TDD UL/DL subframe configuration and may receive a second TDD UL/DL subframe configuration 410. For a WTRU in a CE mode 420, the WTRU may determine DL subframes (e.g., for DL repetitions) based on (or at least on) the first TDD UL/DL subframe configuration and UL subframes (e.g., for UL repetitions) based on (e.g., at least on) the second TDD UL/DL subframe configuration 430. Optionally, the WTRU may determine DL subframes and/or UL subframes based on (e.g., at least on) both the first and second TDD UL/DL configurations. For a determined DL subframe 440, the WTRU may receive a DL signal (e.g., a repetition of a DL signal) in the determined DL subframe 445. For a determined UL subframe 440, the WTRU may transmit an UL signal (e.g., a repetition of an UL signal) in the determined UL subframe 450.

For a WTRU not in a CE mode 420, the WTRU may receive a third TDD UL/DL subframe configuration 460. The WTRU may determine UL and DL subframes based on one or more of (e.g., all three of) the first, second, and third TDD UL/DL subframe configurations 470. For a determined DL subframe 480, the WTRU may receive a DL signal in the determined DL subframe 485. For a determined UL subframe 480, the WTRU may transmit a UL signal in the determined UL subframe 490.

In some embodiments and examples, a repetition such as of an UL and/or DL signal or channel may include the first transmission (or reception). The first transmission or reception of a channel or signal may be considered a repetition (e.g., one of the repetitions) of the channel or signal. In some embodiments and examples a repetition such as of an UL and/or DL signal or channel may exclude the first transmission (or reception) of the signal or channel.

The TDD subframe configuration that may be signaled in higher layer RRC signaling may be used as a DL HARQ reference by (and/or for) an eIMTA-WTRU in normal mode. The TDD subframe configuration which may be signaled in higher layer RRC signaling may be used as a UL resource configuration by (and/or for) an eIMTA-WTRU in coverage enhanced mode of operation.

The DL subframes and special subframes in the TDD subframe configuration that may be signaled in a reconfiguration PDCCH (e.g., with CRC scrambled with eIMTA-RNTI) may be considered or used as DL resources by (and/or for) an eIMTA-WTRU in normal mode. The DL subframes and special subframes in the TDD subframe configuration signaled in SIB-1 may be considered or used as DL resources by (and/or for) an eIMTA-WTRU in the coverage enhanced mode of operation.

A WTRU in a coverage enhanced mode of operation may be configured (e.g., differently) for DL and/or UL resources according to the CE level, the reconfiguration periodicity or both. For example, if a WTRU is configured with (and/or is using) a certain CE level (for example, CE level-1) which may be lower than a predefined threshold (for example, CE level-3), then the DL subframes and special subframes in the TDD subframe configuration signaled in SIB-1 may be considered as DL resources and/or the UL subframes in the TDD subframe configuration signaled in higher layer RRC signaling may be considered as UL resources.

If a WTRU is configured with (and/or is using) a certain CE level (for example, CE level-4) which may be equal to or higher than a predefined threshold (for example, CE level-3), then the DL subframes and special subframes in the TDD subframe configuration signaled in SIB-1 may be considered as DL resources and/or the UL subframes (for example, subframe 2), which may be a UL subframe irrespective of the TDD subframe configuration, may be considered as a (e.g., the only) UL resource.

In another example, an eIMTA-WTRU configured in a coverage enhanced mode of operation may receive the eIMTA-PDCCH with repetitions. In this case, one or more of following procedures may apply. An eIMTA-WTRU in a coverage limited mode of operation (i.e., a coverage limited eIMTA-WTRU) may assume that the DL subframes and special subframes indicated in a TDD subframe configuration signaled in an eIMTA-PDCCH may be the DL resource for repetitions. Also, the UL subframes in the TDD subframe configuration signaled in an eIMTA-PDCCH may be the UL resource for repetitions.

In an example, an eIMTA-WTRU using coverage enhancement in TDD may receive a first TDD UL/DL subframe configuration to identify DL subframes for eIMTA-PDCCH repetitions. The eIMTA-WTRU may monitor the identified DL subframes during a repetition window for eIMTA-PDCCH repetitions. Further, the eIMTA-WTRU may combine the eIMTA-PDCCH repetitions to determine a second TDD UL/DL subframe configuration. The eIMTA-WTRU may use the second TDD UL/DL subframe configuration for transmitting and receiving repetitions of a PDSCH and a PUSCH. In another example, the eIMTA-WTRU may use the second TDD UL/DL subframe configuration for transmitting and receiving repetitions of a PDSCH. In a further example, the eIMTA-WTRU may use the second TDD UL/DL subframe configuration for transmitting and receiving repetitions of a PUSCH.

Further, if a coverage limited eIMTA-WTRU missed the eIMTA-PDCCH in the reconfiguration period, the WTRU may use the fallback TDD mode of operation. In an example, the fallback TDD mode of operation may include that the DL subframes and special subframes in the TDD subframe configuration signaled in SIB-1 may be considered as DL resources. Also, the UL subframes in the TDD subframe configuration signaled in higher layer RRC signaling may be considered as UL resources.

In another example, the fallback TDD mode of operation may include that the DL subframes and special subframes in the TDD subframe configuration signaled in SIB-1 may be considered as DL resources. Also, the UL only subframe (for example, subframe 2), which may always be a UL subframe irrespective of the TDD subframe configuration, may be considered as a UL resource.

In another example, the fallback TDD mode of operation may include that the DL and UL resource may be based on the TDD subframe configuration signaled in SIB-1. Further, if the reconfiguration periodicity may be shorter than a predefined threshold, the coverage limited eIMTA-WTRU may use the fallback TDD mode of operation.

In another example, the coverage of eIMTA-PDCCH may be enhanced. For eIMTA-PDCCH coverage enhancement, one or more of following procedures may apply. For example, the eIMTA-PDCCH may be repetitively transmitted over multiple DL subframes, special subframes or both signaled in the SIB-1 within the reconfiguration period. Further, an eIMTA-PDCCH may be transmitted with eIMTA-RNTI and the eIMTA-RNTI may be WTRU-specific if the eIMTA-WTRU may be in a normal mode of operation. Also, an eIMTA-PDCCH may be transmitted with CE-eIMTA-RNTI and the CE-eIMTA-RNTI may be cell-specific if the eIMTA-WTRU may be in a coverage enhanced mode of operation. In addition, the eIMTA-PDCCH with CE-eIMTA-RNTI may be transmitted in a predefined location within the (E)PDCCH common search space, within the reconfiguration period.

In a further example, the coverage enhanced eIMTA-PDCCH may be supported if the eIMTA reconfiguration periodicity may be equal to or larger than a predefined threshold (for example, 40 ms). Also, the coverage enhanced eIMTA-PDCCH may be supported if the eIMTA-enabled eNode-B indicated that the coverage enhanced eIMTA-PDCCH may be supported. Further, the coverage enhanced mode of operation may supported with eIMTA.

In another example, a subframe dependent power control may be used if an eIMTA-WTRU is in normal mode of operation, while a subframe independent power control may be used if an eIMTA-WTRU is in coverage enhanced mode of operation. In another example, a subframe dependent power control may be used even in the coverage enhanced mode of operation if the eIMTA-WTRU is not in the fallback TDD mode of operation.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method in a wireless transmit/receive unit (WTRU) comprising:
  receiving a first physical downlink shared channel (PDSCH) signal including a system information block (SIB), wherein in the SIB includes first time division duplex (TDD) uplink (UL)/downlink (DL) configuration information;
  receiving a second PDSCH signal including dedicated radio resource control (RRC) signaling, wherein the dedicated RRC signaling includes second TDD UL/DL configuration information;
  receiving a physical downlink control channel (PDCCH) signal including information indicating an uplink grant, wherein the information indicating the uplink grant indicates at least one physical uplink shared channel (PUSCH) repetition transmission;
  determining at least one time interval of the at least one PUSCH repetition transmission that would overlap with a downlink time interval indicated by the first TDD UL/DL configuration information, a downlink time interval indicated by the second TDD UL/DL configuration information, or both; and
  transmitting at least one PUSCH repetition transmission in at least one time interval that is non-overlapping with the downlink time interval indicated by the first TDD UL/DL configuration information, the downlink time interval indicated by the second TDD UL/DL configuration information, or both.

2. The method of claim 1, wherein the first TDD UL/DL configuration information is indicated in a bit map.

3. The method of claim 1, wherein the second TDD UL/DL configuration information is indicated in a bit map.

4. The method of claim 1, wherein the first TDD UL/DL configuration information is indicated in a first parameter and the second TDD UL/DL configuration information is indicated in a second parameter.

5. The method of claim 1, wherein the SIB is a SIB Type 1 (SIB-1).

6. The method of claim 1, wherein the SIB is a SIB Type 2 (SIB-2).

7. The method of claim 1, wherein the determined at least one time interval of the at least one repetition transmission that would overlap is restricted from being used for any repetition transmission.

8. A wireless transmit/receive unit (WTRU) comprising:
  a transceiver; and
  a processor operatively coupled to the transceiver; wherein:
    the transceiver is configured to receive a first physical downlink shared channel (PDSCH) signal including a system information block (SIB), wherein in the SIB includes first time division duplex (TDD) uplink (UL)/downlink (DL) configuration information;
    the transceiver is configured to receive a second PDSCH signal including dedicated radio resource control (RRC) signaling, wherein the dedicated RRC signaling includes second TDD UL/DL configuration information;
    the transceiver is configured to receive a physical downlink control channel (PDCCH) signal including information indicating an uplink grant, wherein the information indicating the uplink grant indicates at least one physical uplink shared channel (PUSCH) repetition transmission;
    the processor is configured to determine at least one time interval of the at least one PUSCH repetition transmission that would overlap with a downlink time interval indicated by the first TDD UL/DL configuration information, a downlink time interval indicated by the second TDD UL/DL configuration information, or both; and
    the transceiver and the processor are configured to transmit at least one PUSCH repetition transmission in at least one time interval that is non-overlapping with the downlink time interval indicated by the first TDD UL/DL configuration information, the downlink time interval indicated by the second TDD UL/DL configuration information, or both.

9. The WTRU of claim 8, wherein the first TDD UL/DL configuration information is indicated in a bit map.

10. The WTRU of claim 8, wherein the second TDD UL/DL configuration information is indicated in a bit map.

11. The WTRU of claim 8, wherein the first TDD UL/DL configuration information is indicated in a first parameter and the second TDD UL/DL configuration information is indicated in a second parameter.

12. The WTRU of claim 8, wherein the SIB is a SIB Type 1 (SIB-1).

13. The WTRU of claim 8, wherein the SIB is a SIB Type 2 (SIB-2).

14. The WTRU of claim 8, wherein the determined at least one time interval of the at least one repetition transmission that would overlap is restricted from being used for any repetition transmission.

15. A base station comprising:
a transceiver; and
a processor operatively coupled to the transceiver; wherein:
  the transceiver and the processor are configured to transmit a first physical downlink shared channel (PDSCH) signal including a system information block (SIB), wherein in the SIB includes first time division duplex (TDD) uplink (UL)/downlink (DL) configuration information;
  the transceiver and the processor are configured to transmit a second PDSCH signal including dedicated radio resource control (RRC) signaling, wherein the dedicated RRC signaling includes second TDD UL/DL configuration information;
  the transceiver and the processor are configured to transmit a physical downlink control channel (PDCCH) signal including information indicating an uplink grant, wherein the information indicating the uplink grant indicates at least one physical uplink shared channel (PUSCH) repetition transmission; and
  the transceiver is configured to receive at least one PUSCH repetition transmission in at least one time interval that is non-overlapping with a downlink time interval indicated by the first TDD UL/DL configuration information, a downlink time interval indicated by the second TDD UL/DL configuration information, or both.

16. The base station of claim 15, wherein the first TDD UL/DL configuration information is indicated in a bit map.

17. The base station of claim 15, wherein the second TDD UL/DL configuration information is indicated in a bit map.

18. The base station of claim 15, wherein the first TDD UL/DL configuration information is indicated in a first parameter and the second TDD UL/DL configuration information is indicated in a second parameter.

19. The base station of claim 15, wherein the SIB is a SIB Type 1 (SIB-1).

20. The base station of claim 15, wherein the SIB is a SIB Type 2 (SIB-2).

* * * * *